June 6, 1933.  H. M. GREIST ET AL  1,913,157
POWER PLANT FOR HOUSEHOLD AND KINDRED USES
Filed April 9, 1931   3 Sheets-Sheet 1
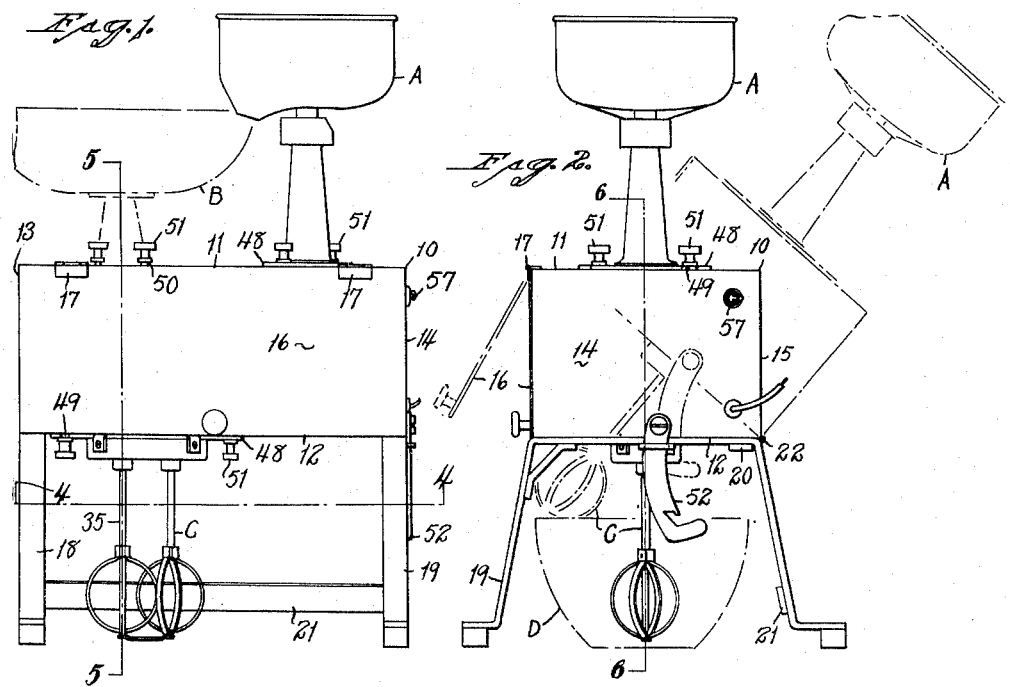
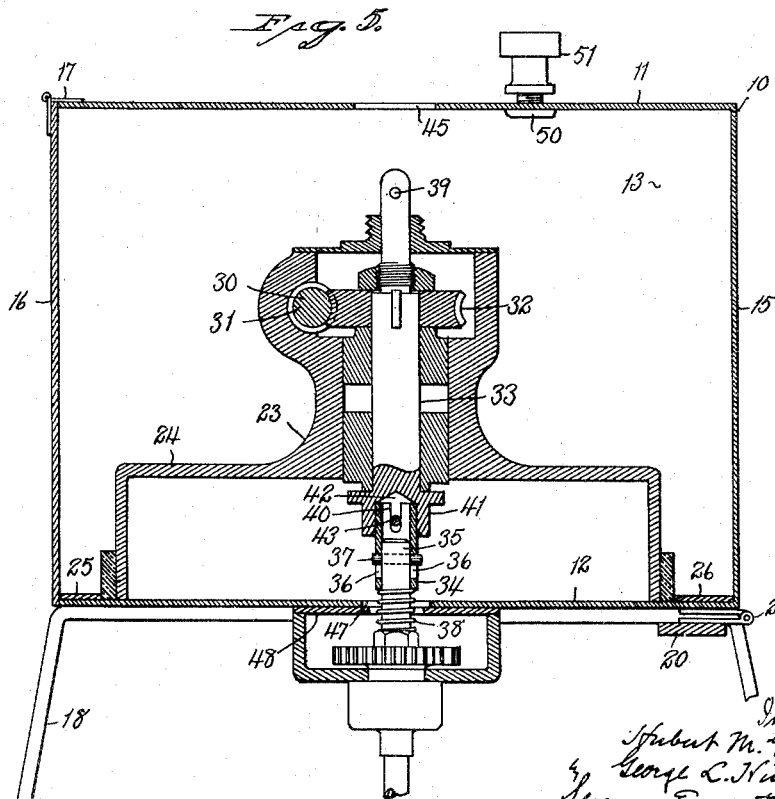

June 6, 1933.  H. M. GREIST ET AL  1,913,157
POWER PLANT FOR HOUSEHOLD AND KINDRED USES
Filed April 9, 1931  3 Sheets-Sheet 2
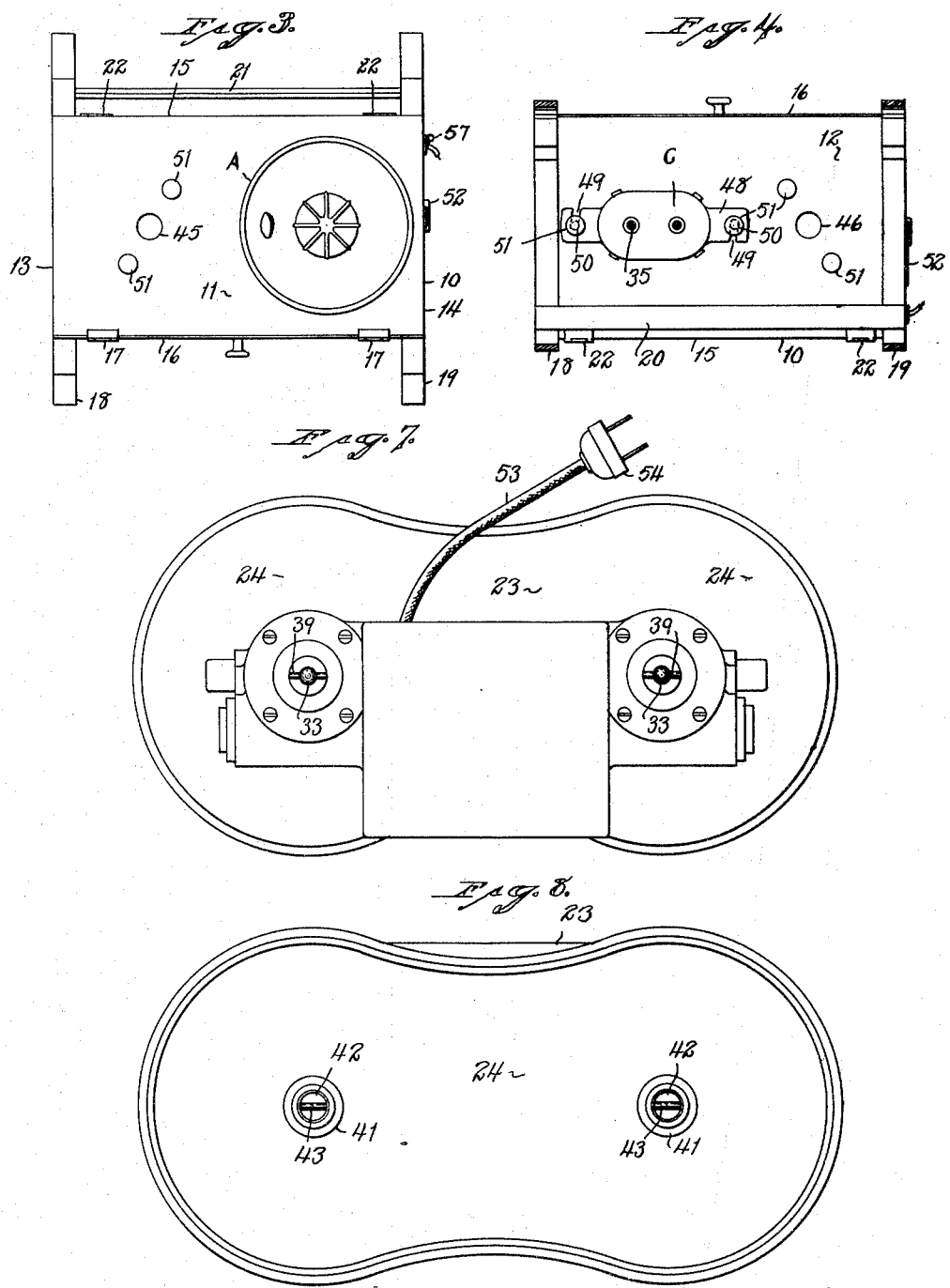

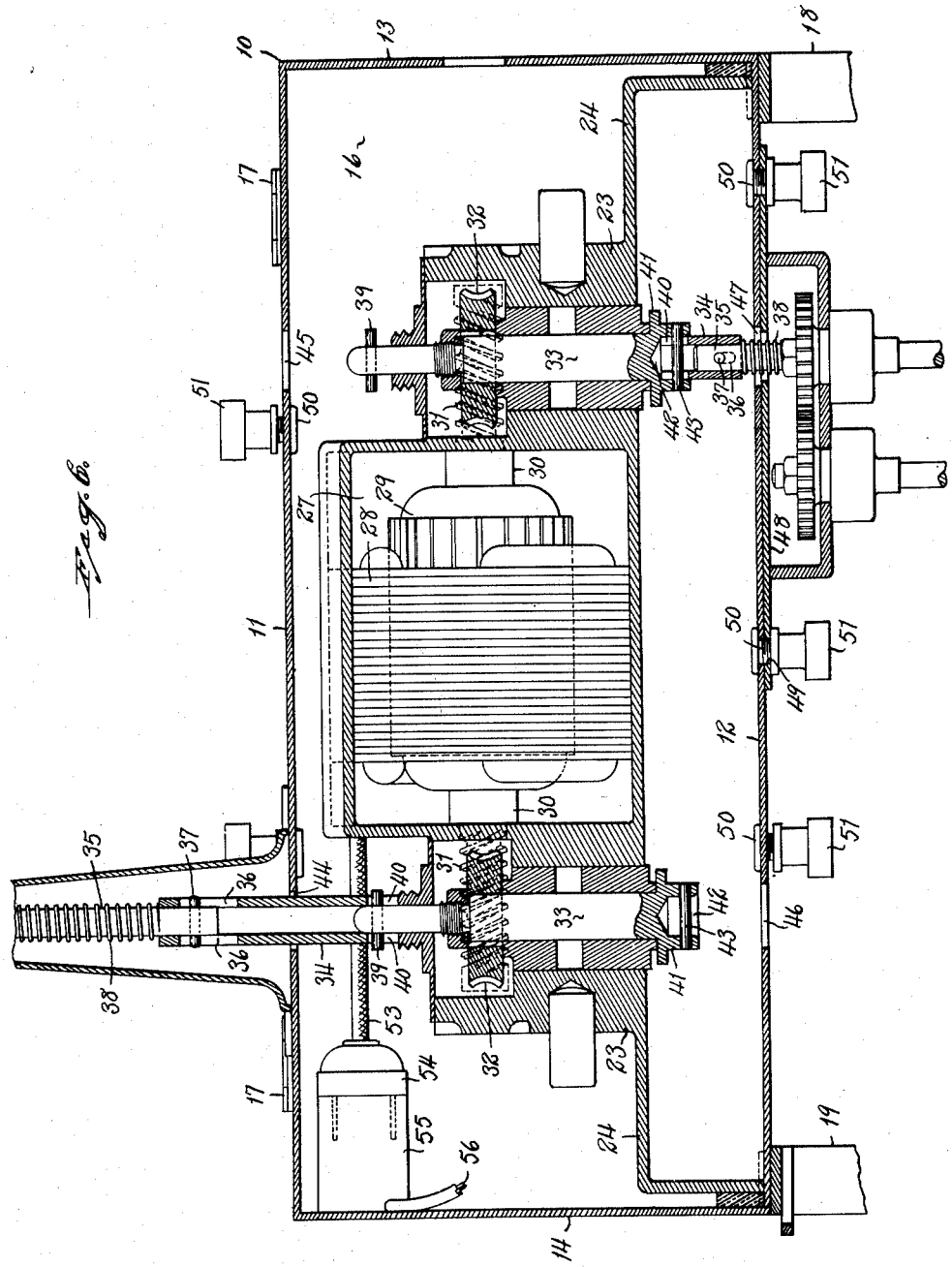

Patented June 6, 1933

1,913,157

UNITED STATES PATENT OFFICE

HUBERT M. GREIST AND GEORGE L. HINMAN, OF NEW HAVEN, CONNECTICUT, ASSIGNORS TO THE GREIST MANUFACTURING COMPANY, OF NEW HAVEN, CONNECTICUT, A CORPORATION

POWER PLANT FOR HOUSEHOLD AND KINDRED USES

Application filed April 9, 1931. Serial No. 528,858.

This invention relates to an improvement in power plants designed for the assistance of the housewife in the performance of household tasks such as in mixing, chopping, beating, juice-extracting, mashing, etc., and kindred household tasks.

The main object of our present invention is to provide a powerful, efficient and reliable power plant of the character referred to for household and kindred uses and constructed with particular reference to superior convenience in use and operation.

With the above and other objects in view as will appear from the following, our invention consists in a power plant for household and kindred uses, having certain details of construction and combinations and arrangements of parts as will be hereinafter described and particularly recited in the claims.

In the accompanying drawings:

Fig. 1 is a view in front elevation of a power plant for household and kindred uses embodying our invention;

Fig. 2 is an end view thereof;

Fig. 3 is a top or plan view thereof;

Fig. 4 is a view thereof in horizontal section taken on the line 4—4 of Fig. 1;

Fig. 5 is a transverse sectional view taken on the line 5—5 of Fig. 1 but on a larger scale;

Fig. 6 is a vertical longitudinal sectional view taken on the line 6—6 of Fig. 2 but on the same scale as Fig. 5;

Fig. 7 is a top or plan view of the driving-unit detached; and

Fig. 8 is an underside view thereof.

The particular household power unit herein chosen for the illustration of our invention consists, as shown, of three main elements—a driving-unit, a casing or cabinet therefor, and a mount for the latter.

The casing or cabinet, generally designated by the numeral 10, consists of a rectangular sheet-metal box having top- and bottom-walls 11 and 12 respectively, end-walls 13 and 14, a back-wall 15 and a swinging front-wall or door 16, secured to the adjacent edge of the top-wall 11 by means of hinges 17—17.

The casing 10 normally rests upon a support or mount consisting of a pair of complementary leg-members 18 and 19 respectively located beneath the respective opposite ends of the casing, and of an inverted U-shaped form as shown. The upper horizontal reach of each of the respective leg-members is connected to the corresponding portion of the other leg-member by a tie-bar 20, preferably spot-welded in place. Similarly, the lower end of the rear vertical reach of each of the respective leg-members referred to is connected to the similar portion of the other leg-member by a second tie-bar 21, also preferably spot-welded in place.

To provide for the bodily tilting of the casing or cabinet 10 for the purpose as will hereinafter appear, the same is connected to the support or mount by suitable hinges such as 22, the respective leaves of which are secured one to the bottom-wall 12 of the casing adjacent the rear edge thereof, and the other to the upper face of the tie-bar 20, already referred to, as clearly shown in Fig. 5 of the drawings.

Located within the casing or cabinet 10, preferably with capacity for ready removal and replacement, is what may be termed a "driving-unit", generally designated by the numeral 23 and consisting in the main of a frame-structure 24 and certain other features carried by the latter as will be presently described. The driving-unit is positioned or located within the casing or cabinet 10 by the engagement of its frame-structure 24 with the respective opposite end-walls 13 and 14 of the latter, and the engagement of its respective front and rear edges with positioning-strips or cleats 25 and 26 respectively, secured to the bottom-wall 12 of the casing.

The frame-structure 24 of the driving-unit above referred to is preferably made of cast metal and is provided centrally with a chamber 27 housing an electric motor which may be of any approved construction and, as shown, consists of the usual field-structure 28 and rotor 29. Each of the respective opposite ends of the shaft 30 upon which the rotor 29 is mounted is cut to form a worm 31, each meshing into a worm-wheel 32 keyed to a vertical shaft 33 for driving the same. Each of the two vertical shafts 33 is mounted in suitable bearings, as shown in Figs. 5 and 6, and projects at its upper and lower ends, respectively, beyond the frame-structure 24 to permit the interchangeable coupling thereto of various kitchen or similar appliances, as will be hereinafter described.

The upper end of each of the vertical shafts 33 is reduced in diameter for entry into the lower end of a coupling-sleeve 34 forming a feature of a kitchen appliance, which latter assumes a variety of forms, but, as herein shown, is each characterized by having a depending coupling-sleeve, such as 34, projecting from its drive-shaft 35, to which it is coupled by being provided at diametrically-opposite points, near its upper end, with longitudinal slots 36—36 receiving the respective opposite ends of a coupling-pin 37 extending diametrically through the drive-shaft 35 just referred to.

Each coupling-sleeve 34 is thus connected to the drive-shaft 35 of the particular appliance of which it forms a feature, so as to drive the same through the intermediary of the pin 37 but with capacity for limited axial movement within the limits permitted by the length of the respective slots 36—36, and is normally held in its extended position by a helical spring 38 encircling the drive-shaft 35 and bearing at its lower end against the upper end of the said coupling-sleeve 34, all for the purpose as will be hereinafter described.

The projecting upper end of each of the vertical shafts 33 of the driving-unit 23 is provided with a diametrical coupling-pin 39 adapted to enter a pair of diametrically-opposite coupling-notches 40—40 formed in the lower end of each of the coupling-sleeves 34. By means of the notches 40—40 and the diametrical coupling-pin 39, the coupling-sleeve may be connected to the vertical shaft 33 for being driven thereby and is, in turn, coupled to the drive-shaft 35 of the appliance by the slots 36—36 and the coupling-pin 37, so as to effect the rotation of the said drive-shaft.

The respective lower ends of each of the vertical shafts 33 are enlarged to provide a coupling-head 41, each of which is formed with a downwardly-opening socket 42 across which extends a diametrically-arranged coupling-pin 43 and which receives the coupling-sleeve 34 of any given kitchen appliance which it is desired to couple thereinto.

The top-wall 11 of the casing or cabinet 10 is provided with openings 44 and 45 respectively aligned with the upper ends of the vertical shafts 33 of the driving-unit 23 to permit the coupling-sleeve 34 of the particular appliance chosen for use to extend through either one of the said openings into coupled engagement with the upper end of the said vertical shaft.

Similarly, the bottom-wall 12 of the casing or cabinet 10 is formed with a pair of openings 46 and 47 respectively aligned with the socket 42 in the lower end of the vertical shafts 33 to permit the upward extension therethrough of the coupling-sleeve 34 of a given appliance which it is desired to have depend from the cabinet.

In the particular embodiment of our invention herein chosen for illustration, we provide for the ready attachment and detachment of the appliances by providing each with a platelike mounting-plate 48, each having a pair of diametrically-opposite concentric notches 49—49 adapted, respectively, to "straddle," so to speak, one or the other of a pair of studs 50—50, a pair of which are located on the cabinet at diametrically opposite points with respect to each of the openings 44, 45, 46 and 47 therein. The outer end of each of the said studs is threaded for the reception of a knurled clamping-nut 51 which is screwed down or up, as the case may be, against the outer face of the mounting-plate 48 of a given appliance, after the notches 49 in the said base have been engaged with the said studs.

Our present invention is not concerned with the particular nature of the appliances capable of being driven by our improved power plant, since these may assume a wide variety of forms, such as the juice extractor A, potato peeler B and beater or mixer C, etc.

From the foregoing it will be seen that our improved power plant is adapted to mount and drive, either separately or simultaneously, both upstanding appliances, such as the juice extractor A and the peeler B or the depending beater or mixer C, without requiring complex and difficult maneuvers upon the part of the housewife, such as reversing the power plant, etc.

The cabinet 10 is hinged to the standard or support, comprising the parts 18, 19, 20 and 21, so that it may be tilted backward, as shown in Fig. 2, to permit the placing and removal of a bowl or dish, such as D, shown by broken lines in Fig. 2. When the cabinet is tipped up as described, it may be held in such position by a pivotal latch 52 of well-known form, and in such position the beater or mixer C, or other depending appliance, is raised sufficiently to permit the bowl D to be placed in position or removed, as desired.

The driving-unit 23 is preferably mounted within the cabinet 10 with capacity for ready removal therefrom, in the event that it is so desired for any reason, by merely lifting the same sufficiently to clear the positioning-bar 25. For this purpose the motor-cord 53 is provided with a plug 54 of usual form adapted to be detachably connected to a socket or receptacle 55 secured within the cabinet to the end-wall 14 thereof and supplied with current through a multiple conductor 56, which current is preferably under the control of a snap-switch 57 mounted in the said end-wall 14 with its finger-button outwardly projecting therefrom, as shown in Figs. 1 and 2.

The coupling-sleeve 34 of each appliance is mounted upon its complementary drive-shaft 35 with capacity for axial yielding movement as already described, so that, in mounting an appliance, as the coupling-sleeve 34 thereof engages with one or the other of the vertical shafts 33, if the coupling-notches 40—40 do not correctly register with the coupling-pin 39 or 43, as the case may be, the appliance may still be secured in place, and upon the first partial rotation of the vertical shaft 33, with which it is engaged, the spring 38 of the appliance will snap the sleeve into coupled engagement with the said shaft the instant the particular coupling-pin is brought into registration with the coupling-notches 40—40 in the coupling-sleeve.

It will be noted that by mounting the driving-unit 23 within the casing or cabinet 10, so that its drive-shafts 33 are completely housed therein, and by providing openings, such as 44, 45, 46 and 47, aligned with the said shafts, that such of the "outlets," so to speak, of the machine as are not in use are not only concealed from view, but present no hazard of injury due to the exposure of revolving parts.

Furthermore, it will be noted that without requiring the reversal of the power plant, or a similar laborious maneuver, either or both upstanding or depending appliances may be used either singly or in battery.

It will be understood by those skilled in the art that our invention may assume varied physical forms without departing from my inventive concept, and we, therefore, do not limit ourselves to the specific embodiment herein chosen for illustration, but only as indicated in the appended claims.

We claim:

1. A power plant for household and kindred uses comprising a motor; a vertical rotating-member driven by the said motor and having each of its respective opposite ends constructed for the connection thereto of an appliance; whereby either depending or upstanding appliances may be operated by the power plant to meet the various requirements of household and kindred tasks; and a casing substantially enclosing the aforesaid motor and vertical rotating-member and provided with a passage aligned with the respective opposite ends of the said vertical rotating-member and provided with means for supporting both depending and upstanding interchangeable appliances; the walls of the said casing adjacent the passages therein, being spaced away from the respective opposite ends of the said vertical rotating-member to shield the same when idling.

2. A power plant for household and kindred uses comprising a motor; a plurality of vertical shafts driven thereby and having each of their respective opposite ends constructed for the connection thereto of an appliance; whereby either depending or upstanding appliances may be operated by the power plant singly or simultaneously to meet the various requirements of household and kindred tasks; and a casing substantially enclosing the aforesaid motor and the said vertical shafts, and provided with a passage aligned with each of the respective opposite ends of the said vertical shafts and provided with means for supporting both depending and upstanding interchangeable appliances; the walls of the said casing adjacent the passages therein, being spaced away from the respective opposite ends of the said vertical shafts to shield the same when idling.

3. In a power plant for household and kindred uses, a housing, a motor mounted therein, and a vertical drive shaft mounted in the housing and driven by the motor and provided at each end thereof with coupling means; in combination with a casing completely enclosing and protecting the housing and the motor and the shaft and having means to detachably hold household and kindred implements in position to be coupled to and driven by either end of the said shaft.

4. In a power plant for household and kindred uses, a housing, a motor mounted therein, and a plurality of vertical drive shafts mounted in the housing and driven by the motor and provided at each end of each thereof with coupling means; in combination with a casing completely enclosing and protecting the housing and the motor and the shafts, and having means to detachably hold household and kindred implements in position to be coupled to and driven by either end of the said shafts.

5. In a power plant for household and kindred uses, a support, a casing pivotally mounted thereon, a housing mounted within the casing, a vertical power driven shaft mounted in the housing and completely within the casing and provided at each end with coupling means, and means on the top and bottom of the casing for detachably mounting household and kindred implements thereon to be coupled to the said shaft.

6. In a power plant for household and kindred uses, a casing, a housing removably mounted and enclosed therein, a motor mounted in the said housing, a vertical drive shaft driven by the said motor and mounted in the said housing and completely within the said casing, means on the top and bottom of the said casing to removably mount household and kindred implements thereon in upstanding and depending relation thereto, and means to connect such implements to the adjacent end of the said shaft to be actuated thereby singly or simultaneously.

7. In a power plant for household and kindred uses, a housing, a power driven shaft horizontally mounted therein and provided with a worm at each end, a pair of vertical shafts mounted in the housing adjacent to the respective worms, a worm gear mounted on each of the said shafts and meshing with the respective worms to be driven thereby, coupling means at each end of each shaft, a casing supporting the housing and completely containing the housing and shafts and gears and coupling means, an aperture in the casing adjacent to each end of each vertical shaft, and means on the casing to detachably mount a household or kindred implement in each aperture to be coupled to the adjacent end of either vertical shaft.

In testimony whereof, we have signed this specification.

HUBERT M. GREIST.
GEORGE L. HINMAN.